(12) United States Patent
Yang

(10) Patent No.: US 7,110,481 B2
(45) Date of Patent: Sep. 19, 2006

(54) MULTIPATH RAKE RECEIVER OF HIGH SYMBOL RATE BURST COMMUNICATION SYSTEM

(76) Inventor: George L. Yang, 15 Longfellow Ct., Freehold, NJ (US) 07728

( * ) Notice: Subject to any disclaimer, the term of this patent is extended or adjusted under 35 U.S.C. 154(b) by 798 days.

(21) Appl. No.: 10/260,378

(22) Filed: Sep. 28, 2002

(65) Prior Publication Data

US 2004/0062327 A1    Apr. 1, 2004

(51) Int. Cl.
*H04B 7/10* (2006.01)
(52) U.S. Cl. .................................. 375/347; 375/152
(58) Field of Classification Search ................ 375/347, 375/316, 152, 143, 343, 349, 150, 142; 455/132, 455/65, 137, 138, 139, 506
See application file for complete search history.

(56) References Cited

U.S. PATENT DOCUMENTS 5,648,983 A *  7/1997  Kostic et al. ................ 375/150

2001/0048724 A1 * 12/2001  Subramanian ............... 375/322

* cited by examiner

*Primary Examiner*—Dac Ha
*Assistant Examiner*—Jaison Joseph

(57) ABSTRACT

A receiver for combining multipath significant components and correcting the frequency error and the phase error associated with each significant component consists of delay devices, path strength estimators, error signal generators, scaling signal updating devices, a decision circuit, and a controller. The controller extracts information about each significant component and generates initial scaling signals and other timing and control signals. Different significant components delayed by different amount of time through corresponding delay devices and multiplied by corresponding scaling signals from scaling signal updating devices, are added together for the decision circuit to make a decision. The scaling signal updating devices update the scaling signal according to the path strength signals generated by the path strength estimators through monitoring significant components and the error signals generated by the error signal generators through comparing the signals sending to the decision circuit and the decision made by the decision circuit.

20 Claims, 8 Drawing Sheets

MULTIPATH RAKE RECEIVER OF HIGH SYMBOL RATE BURST COMMUNICATION SYSTEM

FEDERALLY SPONSORED RESEARCH

Not Applicable

SEQUENCE LISTING OR PROGRAM

Not Applicable

FIELD OF THE INVENTION

The invention is generally related to a multipath receiver of a burst communication system with high symbol rate. More particularly the invention is related to combining weight adjustment device and phase adjustment device together and applying weight scaling, frequency correction, and phase correction at one complex multiplication.

BACKGROUND OF THE INVENTION

In a wireless communication system, especially in a mobile communication system, fading occurs from times to times. Buildings, mountains, and foliage on the transmission path between a transmitter and a receiver can cause reflection, diffraction, and scattering on a propagating electromagnetic wave. The electromagnetic waves reflected from various large objects, travel along different paths of varying lengths. If there is an obstacle with sharp irregularities on the transmission path, the secondary waves resulting from the obstructing surface are present around the obstacle. Also if there are small objects, rough surfaces, and other irregularities on the transmission path, scattered waves are created. All these waves will interact with each other and result in multipath fading.

A multipath signal combiner is one of the methods to deal with the multipath-fading problem. For each path of a multipath-fading signal, there is a corresponding component signal. A multipath signal combiner in a receiver is to combine all the significant component signals according to their corresponding signal strengths. On average, a multipath signal combiner can provide a signal more stable and stronger than each individual component signal and therefore improves the system performance.

A demodulator of a coherent receiver has to remove both frequency error and phase error to recover data. Ordinarily, there are a frequency corrector and a phase rotator. The frequency corrector is for removing the frequency error so that the frequency error remaining after correction does not exceed a few percent of the symbol rate. The phase rotator is for getting rid of the residual frequency error and the phase error.

Nowadays one of the most common burst communication systems is packet-switched communication system. As a burst communication system, a packet-switched communication system places unusual demand on a carrier recover circuit especially when the transmitted data rate is substantially high. The data received at a receiver could from a transmitter for a short length of time and then from another different transmitter for another short length of time. The different bursts of data come from different transmitters and have no phase coherence from one burst to the next in most situations. In order to achieve good efficiency, only a very small portion of each burst can be devoted to carrier recovery in a packet-switched communication system. Usually, this very small portion is located at the beginning of each burst. The symbols in the very small portion are called preamble symbols.

When symbol rate is so high that the combination of Doppler frequency spread and frequency offset is no more than a few percent of a symbol rate, it is possible to use only a phase rotator to correct both the frequency error and phase error.

FIG. 1 is the essential portion of a baseband multipath RAKE receiver with the capability of frequency correction and phase correction. Suppose that there are at most K significant multipath components. Multipath splitter 105 splits the received complex signal $R_{in}$ into K complex component signals. Each of the delay devices $110_1$ to $110_K$ delays one of the K complex component signals for a different amount of time. Each of the multipliers $115_1$ to $115_K$ scales the output complex signal from one of the delay devices $110_1$ to $110_K$ by a corresponding weight from controller 130 respectively. Each of the phase rotator devices $120_1$ to $120_K$ rotates the output complex signal from one of the multipliers $115_1$ to $115_K$ by a corresponding phase from the controller 130 respectively. Adder 125 adds the output signals from the phase rotator devices $120_1$ to $120_K$ together to generate a summation signal. Decision circuit 130 makes decision on the transmitted symbol from the summation signal. Controller 135 collects information from various devices and generates necessary control and timing signals for relevant devices such as the delay devices $110_1$ to $110_K$, the multipliers $115_1$ to $115_K$ and the phase rotator devices $120_1$ to $120_K$.

FIG. 2 shows the structure of a conventional phase rotator. The desired phase adjustment $\theta$ is fed to ROM (read only memory) device 205 to obtain corresponding signals $\sin(\theta)$ and $\cos(\theta)$. The complex input signal of the phase rotator consists of a real signal $I_{in}$ and an imaginary signal $Q_{in}$. Multiplier $210_1$ multiplies the real signal $I_{in}$ by $\cos(\theta)$ to obtain the first product and multiplier $210_2$ multiplies the real signal $I_{in}$ by $\sin(\theta)$ to obtain the second product. Multiplier $210_3$ multiplies the imaginary signal $Q_{in}$ by $\cos(\theta)$ to obtain the third product and multiplier $210_4$ multiplies the imaginary signal $Q_{in}$ by $\sin(\theta)$ to obtain the fourth product. Adder $215_1$ subtracts the fourth product from the first product to obtain a signal $I_{out}$ and adder $215_2$ adds the second product to the third product to obtain a signal $Q_{out}$. The output signal of the phase rotator is a complex signal ($I_{out}$, $Q_{out}$).

Mathematically, one can obtain $$I_{out}+jQ_{out}=(I_{in}+jQ_{in})\cdot e^{j\theta}=(I_{in}\cdot\cos(\theta)-Q_{in}\cdot\sin(\theta))+j(I_{in}\cdot\sin(\theta)+Q_{in}\cdot\cos(\theta)) \quad (1)$$

Since sine and cosine functions are nonlinear functions and difficult to calculate them with enough precision on real time, usually they are pre-calculated and stored in ROM as shown in FIG. 2 and therefore a lot of hardware will be consumed.

Therefore, it would be desirable to eliminate the evaluation of the nonlinear function $\sin(\theta)$ and $\cos(\theta)$ in a phase rotator.

OBJECTIVES OF THE INVENTION

The primary objective of the invention is to eliminate the calculation of sine and cosine functions in a conventional phase rotator device.

Another objective of the invention is to combine weight adjustment device and phase adjustment device together.

Another objective of the invention is to apply weight scaling, frequency correction, and phase correction at one complex multiplication.

BRIEF DESCRIPTION OF THE DRAWINGS

The accompanying drawings, which are incorporated in and constitute a part of the specification, describe the preferred embodiment of the present invention, and together with the description, serve to explain the principle of the invention. In the figures, like reference numerals refer to the same or similar elements.

DETAILED DESCRIPTION OF THE PREFERRED EMBODIMENTS

Detailed description of the preferred embodiment is provided herein. The embodiment illustrates a multipath RAKE receiver with phase rotators to serve both frequency error correction and phase error correction by way of examples, not by way of limitations. It is to be understood that it could be easy for those skilled in the art to modify the embodiment in many different ways without departing from the spirit and scope of the invention. Therefore, specific details disclosed are not to be interpreted as limitations, but rather as bases for the claims and as representative bases for teaching one to employ the present invention in virtually any appropriately detailed system, structure or manner.

Figure 1:
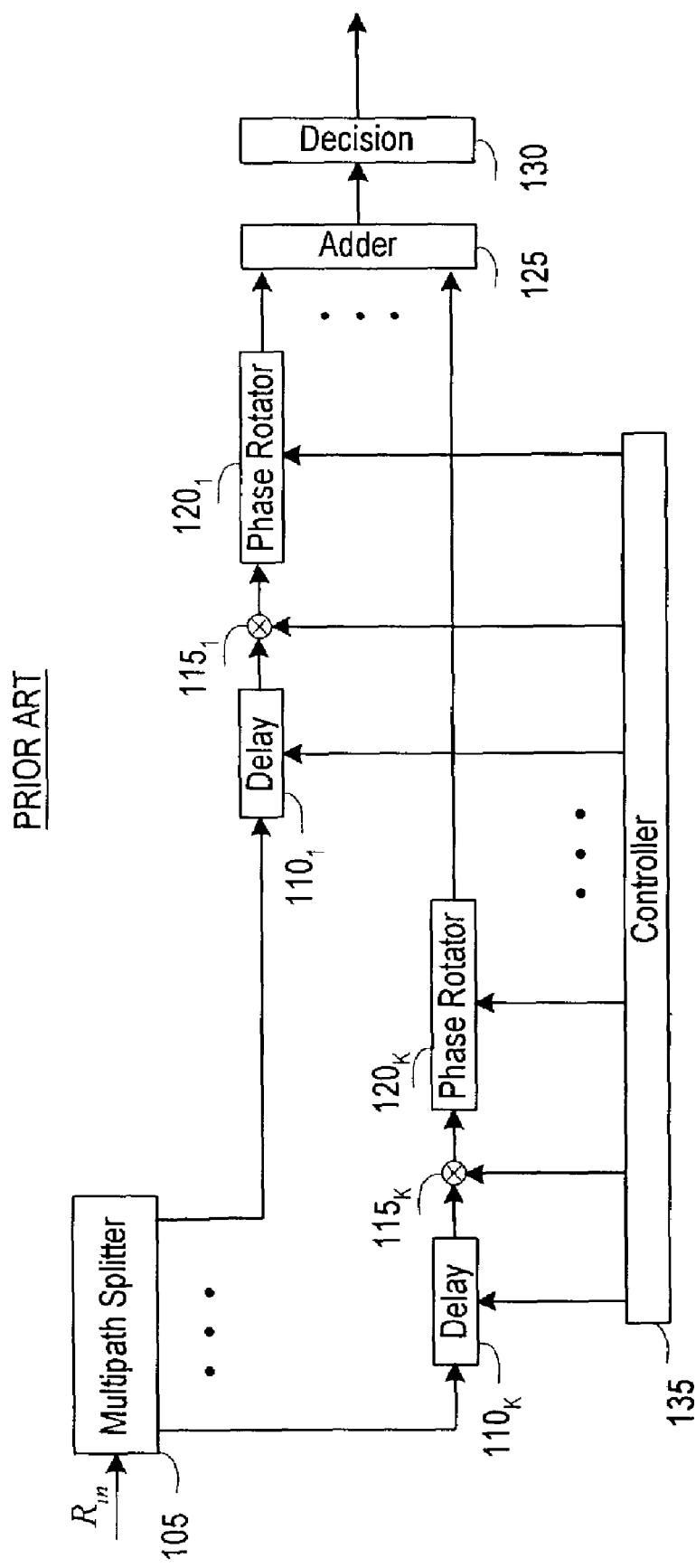
FIG. 1 illustrates a conventional implementation of a multipath RAKE receiver with conventional phase rotators.
Figure 2:
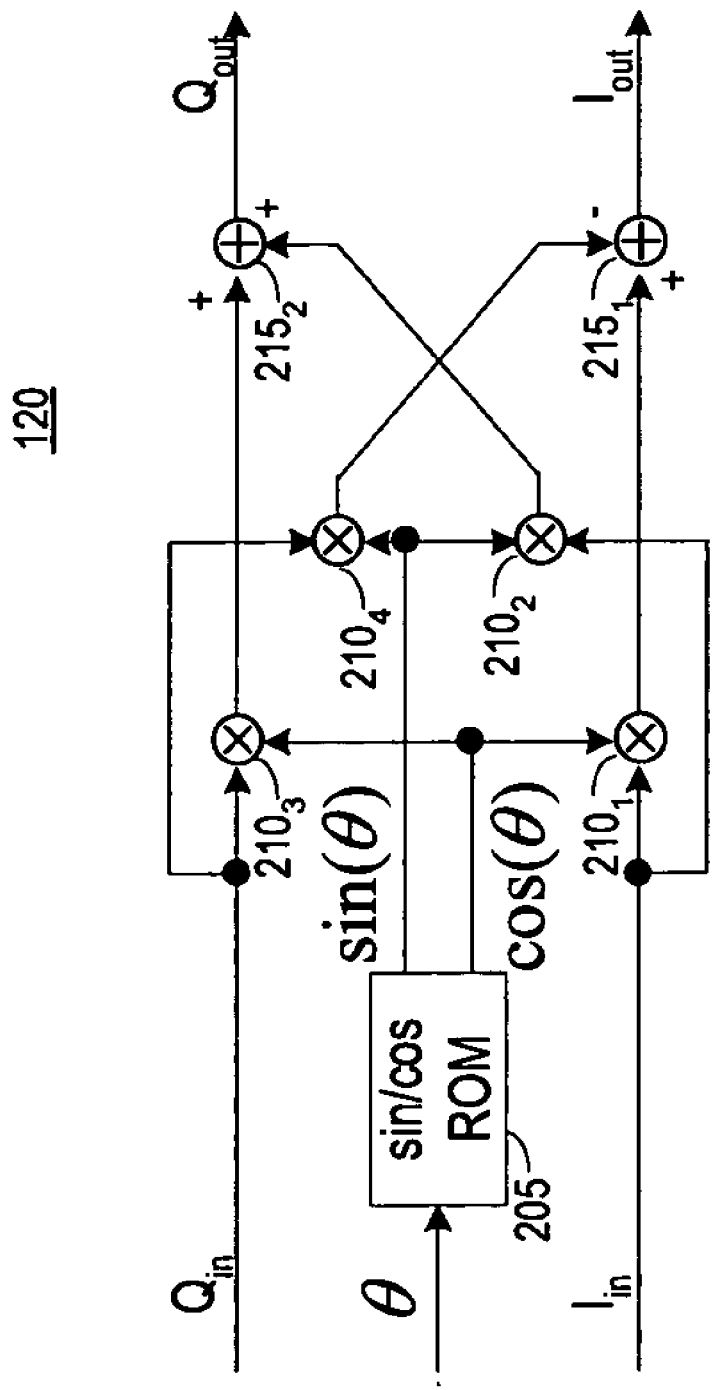
FIG. 2 illustrates one of the conventional phase rotators in FIG. 1.
Figure 3:
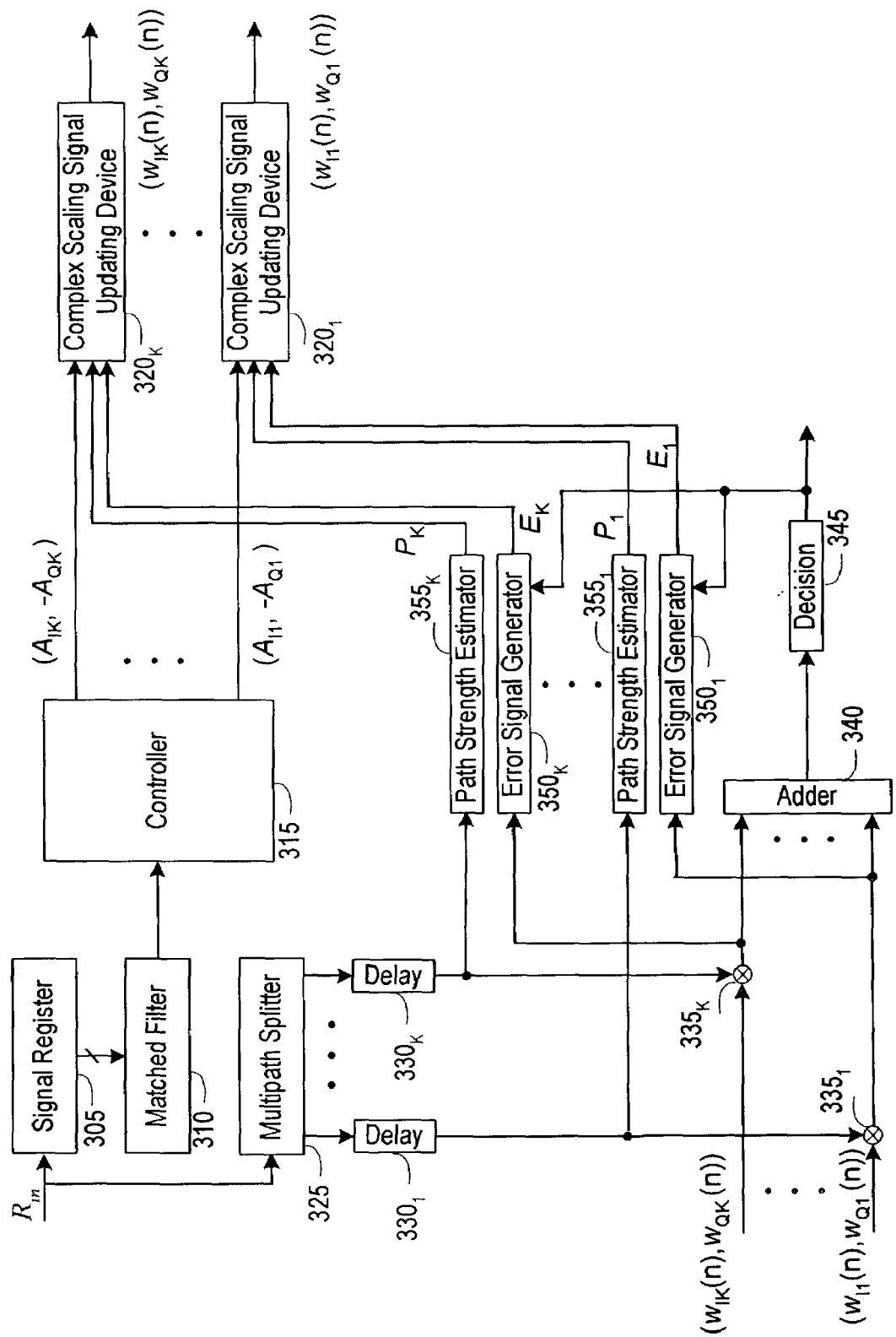
FIG. 3 illustrates the preferred embodiment of a multipath Rake receiver of the invention with combining a weight updating device and a phase updating device as a complex scaling signal updating device.

FIG. 3 shows structure of a multipath Rake receiver with combining a weight updating device and a phase updating device as a complex scaling signal updating device.

Again we assume there are at most K significant paths and therefore there are at most K significant component signals.

The received complex signal $R_{in}$ is fed to signal register 305, which consists of a plurality of signal shift registers with the first signal shift register coupled to the received complex signal $R_{in}$ and each of the rest signal shift registers cascaded to its previous signal shift register. There is a tapped output signal from each signal shift register. The received signal $R_{in}$ and all these tapped output signals are sent to matched-filter 310.

The matched filter 310 is to find the correlation between a segment of the received complex signal represented by the tapped output signals of the signal register 305 and a segment of reference signal. Coupled to the output of the matched filter 310, controller 315 extracts the information about each significant path of a multipath fading signal from preamble symbols associated with each burst. The information could include the position, magnitude, and phase about each significant path. Generally speaking, the controller 315 collects necessary information from relevant devices and generates necessary control and timing signals for pertinent devices.

For simplicity, we further assume that all preamble symbols have a zero reference phase. The average real magnitude and imaginary magnitude for significant path k over preamble period are $A_{Ik}$ and $A_{Qk}$ respectively. The conjugate signal of the complex signal ($A_{Ik}$, $A_{Qk}$) is ($A_{Ik}$, $-A_{Qk}$), which is the initial complex scaling signal ($W_{Ik}(0)$, $W_{Qk}(0)$) for path k. Each of the K complex signals ($A_{I1}$, $-A_{Q1}$), ..., ($A_{IK}$, $-A_{QK}$) is sent to one of the complex scaling signal updating devices $320_1$ to $320_K$ respectively.

The received complex signal $R_{in}$ is also sent to a multipath splitter 325 to obtain K significant component signals. Each of delay devices $330_1$ to $330_K$ delays one of the K significant component signals by a different amount of time. The controller 315 controls the amount of delay possessed by a delay device based on the position of a corresponding significant component signal.

Complex multiplier $335_k$ multiplies the output signal from the delay device $330_k$ by a corresponding complex scaling signal ($W_{Ik}(n)$, $W_{Qk}(n)$), where k=1, ..., K and n=0, 1, 2, ....

Adder 340 adds the K output signals from each of the K complex multipliers $335_1$ to $335_K$ together and decision device 345 makes a decision on the transmitted symbols from the output signal of the adder 340. Suppose there are M possible different transmitted symbols and the decision for the current symbol is ($I_m$, $Q_m$), where m takes integer value from 1 to M ....

Error signal generators $350_1$ to $350_K$ receive signals from the decision circuit 345 and the complex multipliers $335_1$ to $335_K$ to find error signal $E_k$, k=1, ..., K. Each error signal $E_k$ is a signal reflecting the phase error between the estimated transmitted signal determined by the decision device 345 and the estimated transmitted signal determined by the significant component signal k alone. Let's denote the estimated transmitted signal determined by the significant component signal k alone by ($R_{Ik}$, $R_{Qk}$). One can define an error signal as $$E_k = (I_m + jQ_m) \cdot (R_{Ik} + jR_{Qk})^* = (I_m \cdot R_{Ik} + Q_m \cdot R_{Qk}) + j(Q_m \cdot R_{Ik} - I_m \cdot R_{Qk}) = E_{Ik} + jE_{Qk} = |E_k| \cdot e^{j\phi} \quad (2)$$

When the phase error $|\phi| << 90°$, $E_{Qk} \approx 0$, $E_{Ik} > 0$ and $|E_k| \approx E_{Ik}$.

Each of path strength estimators $355_1$ to $355_K$ receives the output signal from one of the K delay devices $330_1$ to $330_K$ for estimating the signal strength of a different significant path. The signal strength of a signal could be anything which can be used to measure the relatively strength of a signal, such as the power of the signal, the magnitude of the signal, or the energy of the signal in one symbol period. The signal strength of path k is represented by $P_k$.

Complex scaling signal updating devices $320_k$ receives the signals from the error signal generator $350_k$ and path strength estimator $355_k$ to obtain a updated complex scaling signal ($W_{Ik}(n)$, $W_{Qk}(n)$), where k=1, ..., K and n=1, 2, 3, ....

Figure 4:
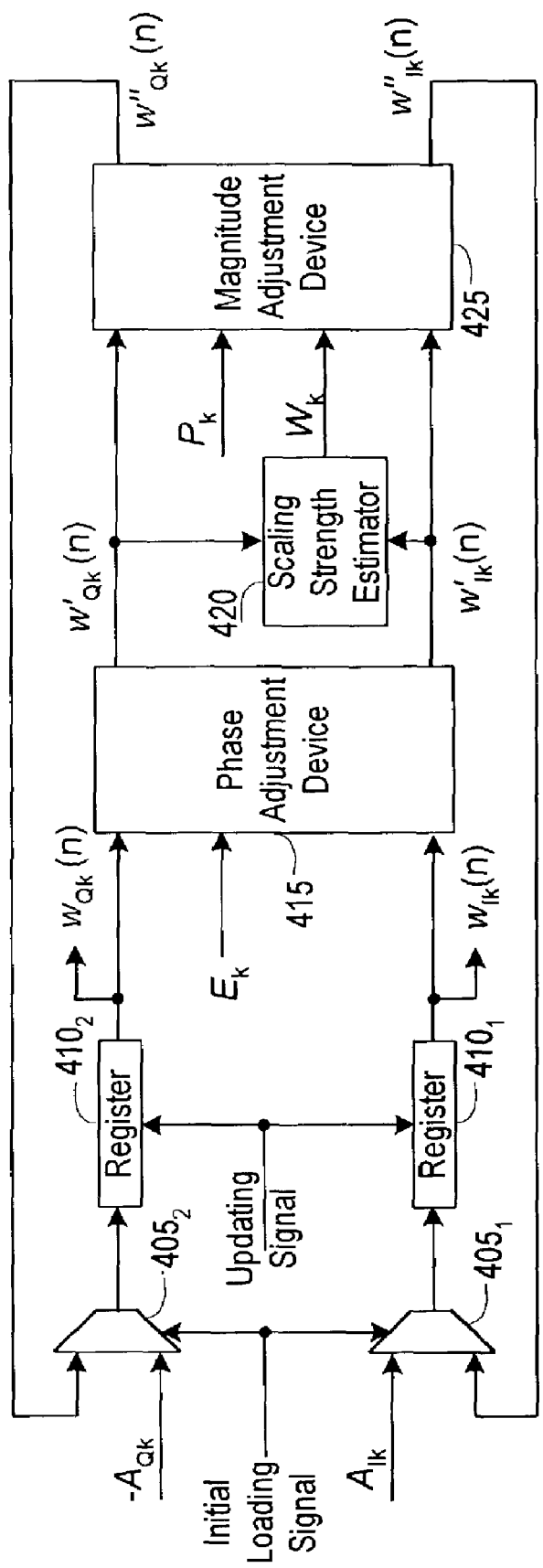
FIG. 4 illustrates a complex scaling signal updating device to update the magnitude and the phase of a complex scaling signal.

FIG. 4 shows a complex scaling signal updating device.

The initial complex scaling signal for significant path k is denoted by ($W_{Ik}(0)$, $W_{Qk}(0)$).

The controller 315 generates initial loading signal to make multiplexer $405_1$ pass $A_{Ik}$ and generates updating signal to save $A_{Ik}$ into register $410_1$. Also the initial loading signal makes multiplexer $405_2$ pass $-A_{Qk}$ and the updating signal saves $-A_{Qk}$ into register $410_2$. That is, ($W_{Ik}(0)$, $W_{Qk}(0)$) = ($A_{Ik}$, $-A_{Qk}$).

Phase adjusting device 415 receives the error signal $E_k$ from the error signal generator k to update the phase of the complex scaling signal ($W_{Ik}(n)$, $W_{Qk}(n)$). The output signal of the phase adjusting device 415 is denoted by ($W'_{Ik}(n)$, $W'_{Qk}(n)$).

Scaling strength estimator 420 is to estimate the signal strength denoted by Wk of the complex signal ($W'_{Ik}(n)$, $W'_{Qk}(n)$). Magnitude adjustment device 425 receives signals from the phase adjustment device 415 and the scaling strength estimator 420 to adjust the magnitude of ($W'_{Ik}(n)$, $W'_{Qk}(n)$) to produce ($W''_{Ik}(n)$, $W''_{Qk}(n)$). When the updating signal is active, the real part and imaginary part of ($W''_{Ik}(n)$, $W''_{Qk}(n)$) will be loaded into the register $410_1$ to $410_2$ through the multiplexers $405_1$ and $405_2$ respectively. The updated outputs of the register $410_1$ to $410_2$ constitute an updated complex scaling signal denoted by ($W_{Ik}(n+1)$, $W_{Qk}(n+1)$).

Figure 5:
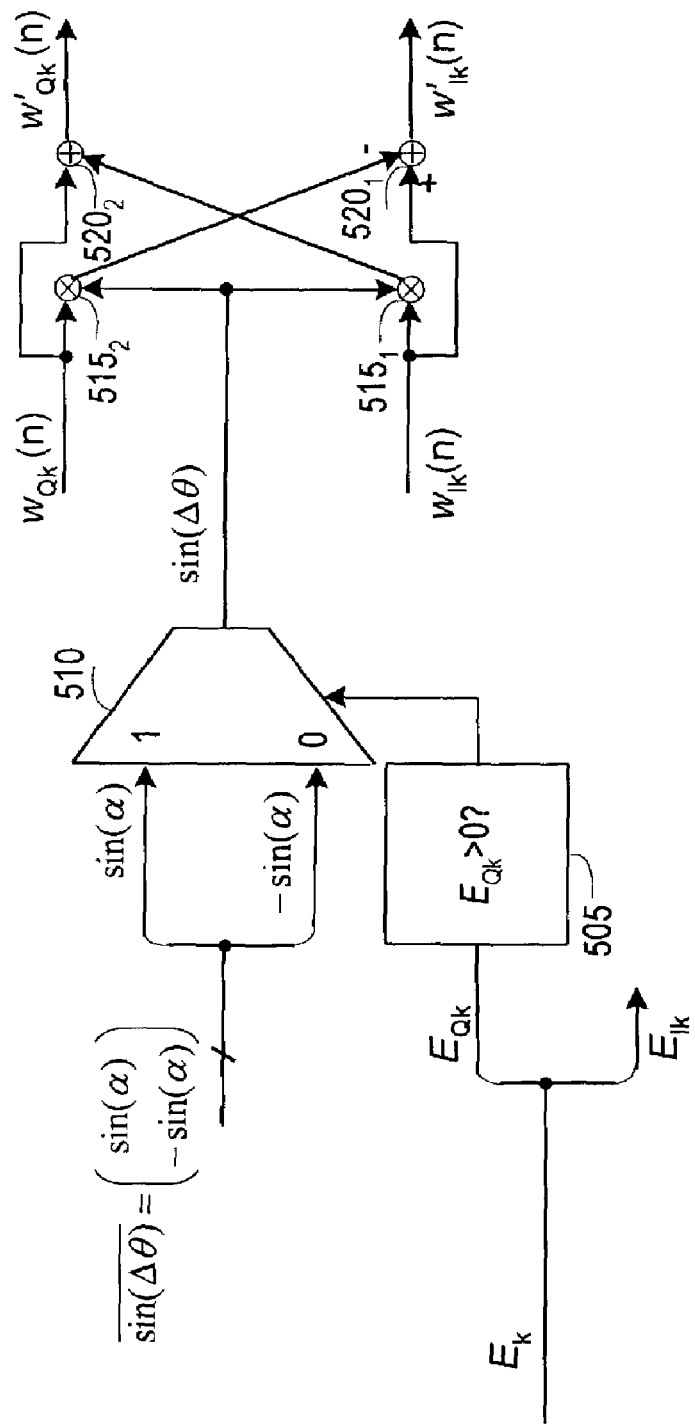
FIG. 5 illustrates an implementation of the phase adjustment device in FIG. 4.

FIG. 5 shows the first implementation of the phase adjustment device 415 in FIG. 4. The error signal $E_k$ from a corresponding error signal generator $350_k$ is split into real signal $E_{Ik}$ and imaginary signal $E_{Qk}$. Comparison circuit 505 tests if the imaginary signal $E_{Qk}$ is larger than 0. If yes, the comparison circuit 505 generates a binary 1 otherwise generates a binary 0.

Multiplexer 510 has two constant input signals, one is $\sin(\alpha)$ and another is $-\sin(\alpha)$, where $\alpha$ is a small positive number $\sin(\alpha)<<1$. With the control signal from the comparison circuit 505, the multiplexer 510 selects $\sin(\alpha)$ if $E_{Qk}>0$ and selects $-\sin(\alpha)$ otherwise.

The output signal of the multiplexer 510 is denoted by $\sin(\Delta\theta)$ with $\Delta\theta=\alpha$ or $-\alpha$. Coupled to the output of the multiplexer 510, multiplier 515, multiplies $\sin(\Delta\theta)$ by $W_{Ik}(n)$ from the register $410_1$ to obtain the first product and multiplier $515_2$ multiplies $\sin(\Delta\theta)$ by $W_{Qk}(n)$ from the register $410_2$ to obtain the second product. Adder $520_2$ adds the first product to $W_{Qk}(n)$ to generate signal $W'_{Qk}(n)$ and adder $520_1$ subtracts the second product from $W_{Ik}(n)$ to generate signal $W'_{Ik}(n)$. Mathematically, $$W'_{Ik}(n)+j \cdot W'_{Qk}(n)=(W_{Ik}(n)-W_{Qk}(n) \cdot \sin(\Delta\theta))+j \cdot (W_{Qk}(n)+W_{Ik}(n) \cdot \sin(\Delta\theta)) \quad (3)$$

Figure 6:
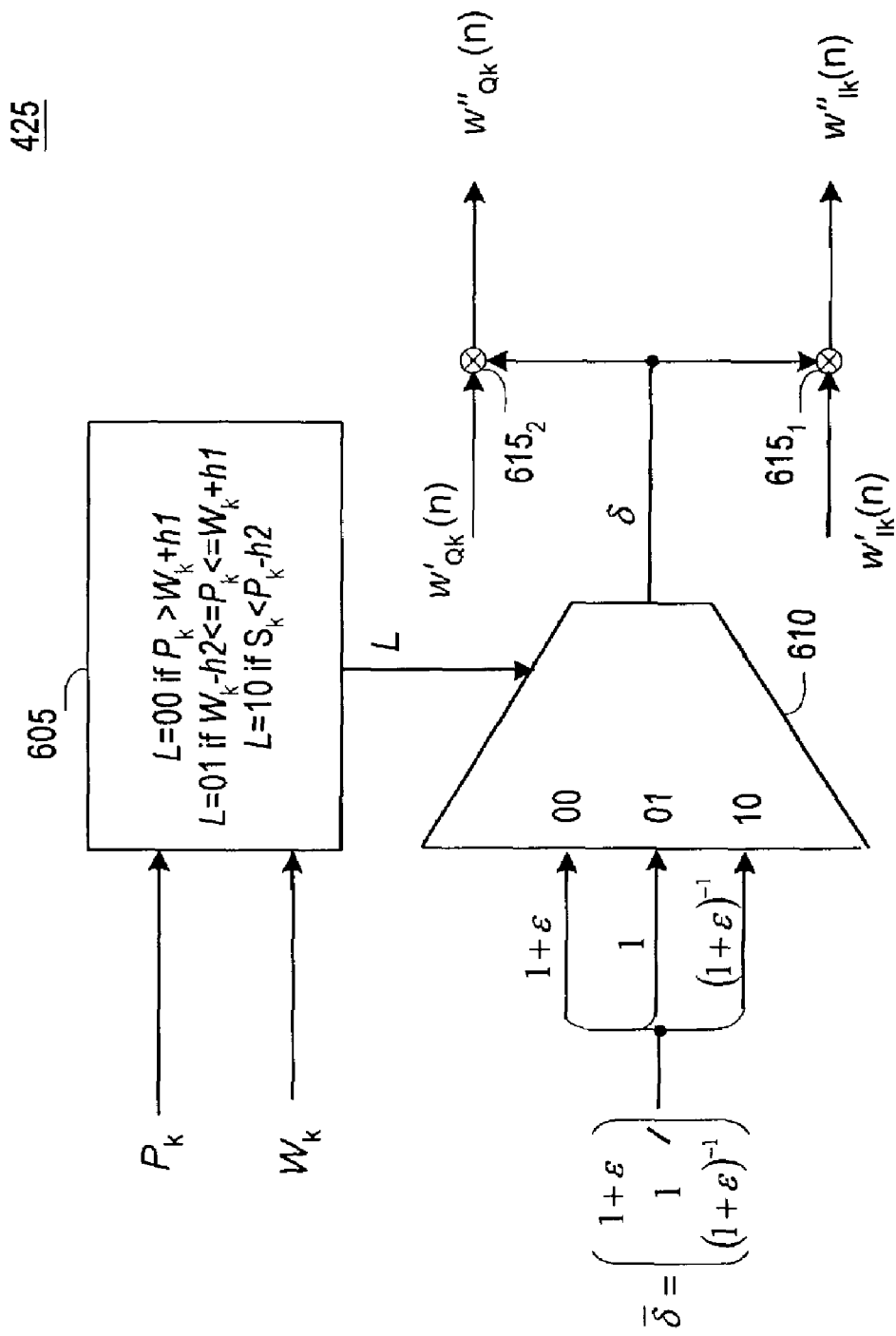
FIG. 6 illustrates an implementation of the magnitude adjustment device in FIG. 4.

FIG. 6 shows the first implementation of the magnitude adjustment device in FIG. 4.

Comparison circuit 605 receives the path strength $P_k$ from the path strength estimator $355_k$ and scaling strength signal $W_k$ from scaling strength estimator 420 to generate a control signal L with two binary digits. L=00 when $P_k>W_k+h1$, L=01 when $W_k+h1>=P_k>=W_k-h2$, and L=10 when $P_k<W_k-h2$. Where h1 and h2 are predefined positive numbers.

With the control signal L from the comparison circuit 605, multiplexer 610 selects one factor $\delta$ from a factor vector $\bar{\delta}$. Multiplier $615_1$ multiplies $\delta$ by $W'_{Ik}(n)$ to obtain $W''_{Ik}(n)$ and Multiplier $615_2$ multiplies $\delta$ by $W''_{Qk}(n)$ to obtain $W'_{Qk}(n)$.

Mathematically, $$W''_{Ik}(n)+j \cdot W''_{Qk}(n)=W'_{Ik}(n) \cdot \delta + j \cdot W'_{Qk}(n) \cdot \delta \quad (4)$$

With the phase adjustment device in FIG. 5 and the magnitude adjustment device in FIG. 6, the updated complex scaling signal ($W_{Ik}(n+1)$, $W_{Qk}(n+1)$) can be expressed as:

$$W_{Ik}(n+1)+j \cdot W_{Qk}(n+1)=(W_{Ik}(n)-W_{Qk}(n) \cdot \sin(\Delta\theta)) \cdot \delta + j \cdot (W_{Qk}(n)+W_{Ik}(n) \cdot \sin(\Delta\theta)) \cdot \delta \quad (5)$$

In order to cover larger distance or have better performance, it is a common practice to increase the energy of a symbol by repeating the symbol several times to generate a large symbol. The phase error accumulated in several symbol periods or a large symbol period could be substantial. For simplicity, either a symbol period or a large symbol period is called a symbol period. In order to correct the phase error, it may be necessary to adjust the phase of a complex scaling signal several times during a large symbol period. The complex scaling signal updating device as shown in FIG. 4 with the implementation of phase adjustment device shown in FIG. 5 and the implementation shown in FIG. 6 can run one time or several times during every symbol period. To be able to adjust several times during one symbol period, the controller 315 has to make control signals such as updating signal active for a corresponding number of times during each symbol period and also to replace $E_{Qk}$ by $E'_{Qk}$. Here $E'_{Qk}$ is equal to $E_{Qk}$ for the first adjustment and $E'_{Qk}=E'_{Qk}-E_{Ik} \cdot \sin(\Delta\theta)$ for each of the rest adjustment during one symbol period.

Figure 7:
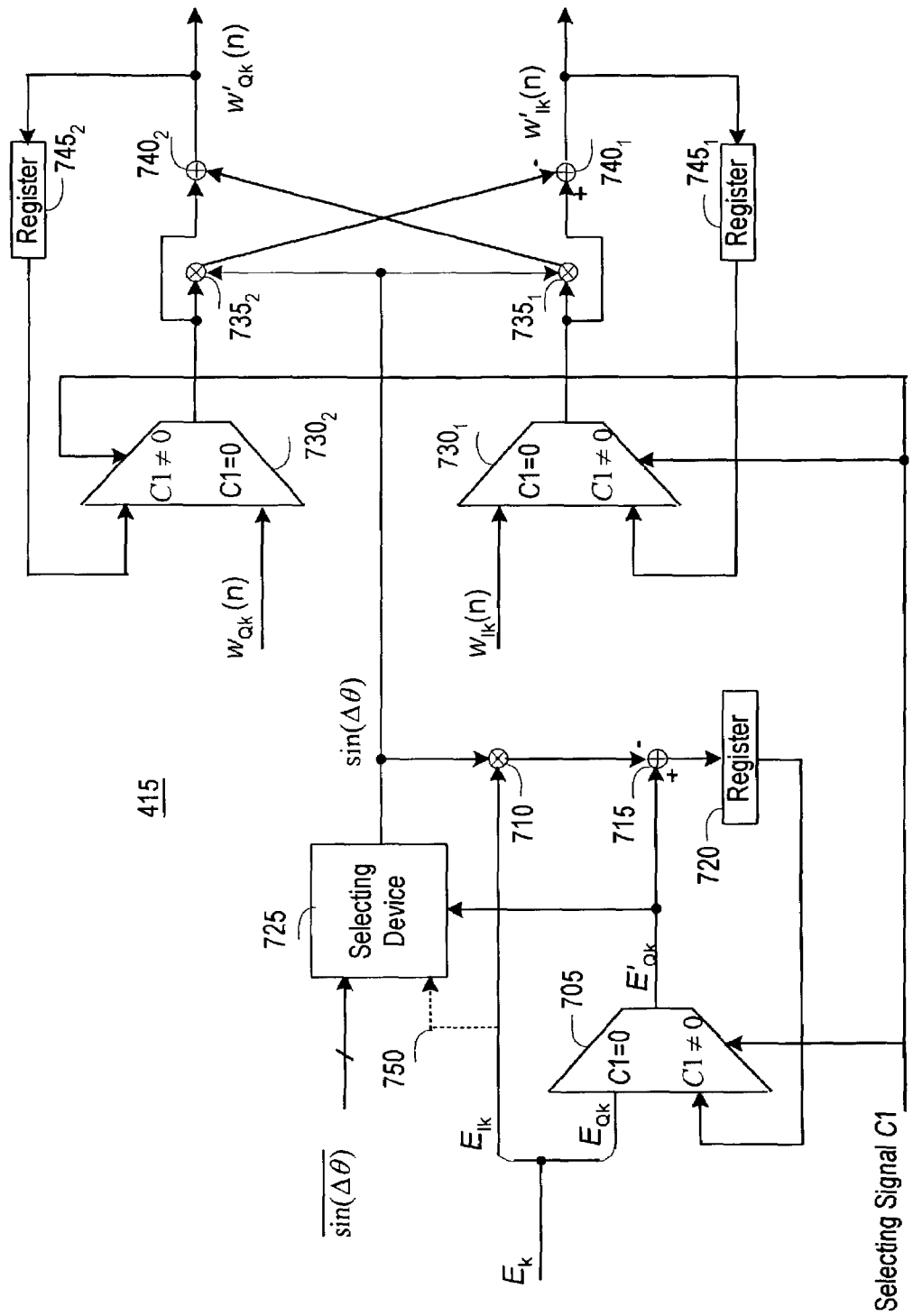
FIG. 7 illustrates another implementation of the phase adjustment device in FIG. 4.
Figure 8:
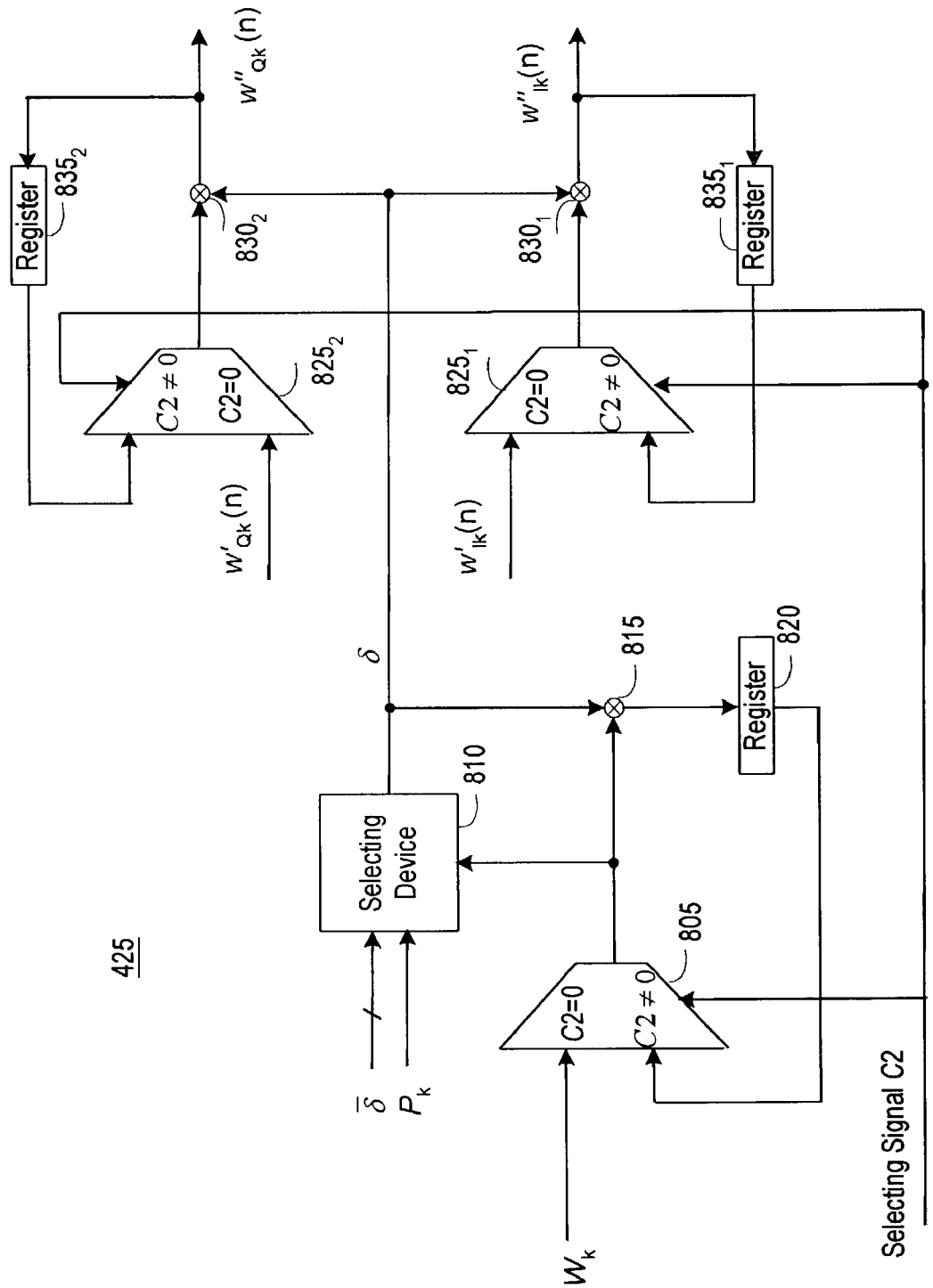
FIG. 8 illustrates another implementation of the magnitude adjustment device in FIG. 4.

Another way to adjust a complex scaling signal several times is shown in FIG. 7 and FIG. 8. One can first adjust the phase of a complex scaling signal several times and then adjust the magnitude of the complex scaling signal several times.

FIG. 7 shows the second implementation of the phase adjustment device in FIG. 4. It has the capability to adjust the phase of a complex scaling signal several times during a symbol period while without over adjusting.

The error signal $E_k$ from the error signal generator $350_k$ is split into real signal $E_{Ik}$ and imaginary signal $E_{Qk}$. Multiplexer 705 receives the imaginary signal $E_{Qk}$ of $E_k$ and the signal from register 720. There is a selecting signal C1 from the controller 315. When C1=0, the multiplexer 705 lets the imaginary signal $E_{Qk}$ pass. When C1≠0, the multiplexer 705 lets the signal from the register 720 pass. The output signal of the multiplexer 705 controls the selecting logic device 725 to select one number from the vector $\overline{\sin(\Delta\theta)}$ for best compensating phase error, where $\overline{\Delta\theta}$ is a set of numbers, which could be ($\alpha$, $-\alpha$), ($\alpha$, 0, $-\alpha$) with $\alpha$ being a small positive number.

After the each phase adjustment, the error signal should be reduced to $$(E'_{Ik}+j \cdot E'_{Qk}) \cdot e^{-j \cdot \Delta\theta}=(E'_{Ik} \cdot \cos(\Delta\theta)+E'_{Qk} \cdot \sin(\Delta\theta))+j \cdot (E'_{Qk} \cdot \cos(\Delta\theta)-E'_{Ik} \cdot \sin(\Delta\theta)) \approx E'_{Ik}+j \cdot (E'_{Qk}-E'_{Ik} \cdot \sin(\Delta\theta)) \quad (6)$$

Where $E'_{Ik}=E_{Ik}$ and $E'_{Qk}=E_{Qk}$ for the very first phase adjustment during each symbol period.

Multiplier 710 multiplies $E_{Ik}$ by $\sin(\Delta\theta)$ to generate a product. Adder 715 subtracts the product from the output signal of the multiplexer 705. Register 720 saves the subtraction and feeds the subtraction back to the multiplexer 705 as one of its input signals.

The selecting signal C1 from the controller 315 makes the multiplexer $730_1$ to pass $W_{Ik}(n)$ for the very first time and to pass the signal from the register $745_1$ for each of the rest times during each symbol period. Similarly, the selecting signal C1 from the controller 315 makes multiplexer $730_2$ to pass $W_{Qk}(n)$ for the very first time and to pass the signal from the register $745_2$ for each of the rest times during each symbol period.

Coupled to the output of the selecting device 725, the multipliers $735_1$ and $735_2$ multiply $\sin(\Delta\theta)$ by the output signal of the multiplexer $730_1$ and the output signal of multiplexer $730_2$ respectively. Adder 740, subtracts the output signal of multiplier $735_2$ from the output signal of multiplexer $730_1$ to generate signal $W'_{Ik}(n)$. Adder $740_2$ adds the output signal of multiplier $735_1$ to the output signal of multiplexer $730_2$ to generate signal $W'_{Qk}(n)$.

A slight modification can be made to make sure no over adjustment. The dot line 750 shows that the selecting device 725 also receives the real signal $E_{Ik}$ of an error signal $E_k$. Also assume $\sin(\alpha 1)$ is the smallest positive element among all the elements of vector $\overline{\sin(\Delta\theta)}$ and $\sin(\alpha 2)$ is the largest negative element among all the elements of vector $\overline{\sin(\Delta\theta)}$.

No further phase updating should be allowed or the output of selecting device 725 should be set to 0, when $E_{Ik}\sin(\alpha 1) > 2E'_{Qk}$ and $E'_{Qk} > 0$, or $E_{Ik}\sin(\alpha 2) < 2E'_{Qk}$ and $E'_{Qk} < 0$. Where $E'_{Qk}$ is the output of the multiplexer 705.

FIG. 8 shows the second implementation of the magnitude adjustment device in FIG. 4.

Multiplexer 805 receives the scaling strength signal $W_k$ from the scaling strength estimator 420 and signal from register 820. There is a selecting signal C2 from the controller 315. When C2=0, the multiplexer 805 lets the scaling strength signal $W_k$ from the scaling strength estimator 420 to pass. When C2≠0, the multiplexer 805 lets the signal from the register 820 pass.

The selecting device 810 receives the output signal of the multiplexer 801₅ and the path strength $P_k$ from the path strength estimator 355$_k$ to choose one factor $\delta$ from a predefined factor vector $\bar{\delta}$. Basically, when the scaling strength signal $W_k$ is smaller than the path signal strength $P_k$, the scaling strength signal $W_k$ should be increased. One way to do is to select a factor larger than 1 to multiply the complex signal $(W'_{Ik}(n), W'_{Qk}(n))$. When scaling strength signal $W_k$ is larger than the path strength $P_k$, the scaling strength signal $W_k$ should be reduced. One way to do is to select a factor smaller than 1 to multiply the complex signal $(W'_{Ik}(n), W'_{Qk}(n))$. When the scaling strength signal $W_k$ is almost equal to the path strength signal $P_k$, the scaling strength signal $W_k$ should not be changed, or a factor 1 will be used to multiply the complex signal $(W'_{Ik}(n), W'_{Qk}(n))$.

Multiplexer 825₁ receives signals from the phase adjustment device 415 and register 835₁. During each symbol period, the selecting signal C2 from the controller 315 makes multiplexer 825₁ pass $W'_{Ik}(n)$ for the very first time and pass the signal from the register 835₁ for rest times. Similarly, multiplexer 825₂ receives signals from the phase adjustment device 415 and register 835₂. During each symbol period, the selecting signal C2 from the controller 315 makes multiplexer 825₂ pass $W'_{Qk}(n)$ for the very first time and pass the signal from the register 835₂ for rest times. Multipliers 830₁ and 830₂ multiply the output signal $\delta$ of the selecting device 810 by the output signals from the multiplexer 825₁ and the multiplexer 825₂ to obtain signals $W''_{Ik}(n)$ and $W''_{Qk}(n)$ respectively.

With the initial loading signal disabled and the updating signal enabled, the signals $W''_{Ik}(n)$ and $W''_{Qk}(n)$ pass the multiplexers 405₁ and 405₂ respectively and are loaded in the registers 410₁ and 410₂ respectively. The updated signals from the registers 410₁ and 410₂ constitute the updated complex scaling signal $(W_{Ik}(n+1), W_{Ik}(n+1))$.

What is claimed:

1. A system for combining pluralities of significant component signals of a multipath fading signal and correcting both frequency error and phase error associated with each of said pluralities of significant component signals, comprising:

a multipath splitter, for separating said multipath fading signal into said pluralities of significant component signals;

pluralities of delay devices, coupled to said multipath splitter and having pluralities of outputs, for delaying each of said pluralities of significant component signals for a respective amount of time to produce pluralities of delayed significant component signals;

pluralities of complex multipliers, coupled to said pluralities of delay devices respectively and to pluralities of complex scaling signal updating devices respectively, for multiplying each of said pluralities of delayed significant component signals by a respective complex scaling signal to produce pluralities of scaled significant component signals;

an adder, coupled to said pluralities of complex multipliers, for adding said pluralities of scaled significant component signals together to produce a summation signal;

a decision circuit, coupled to said adder, for making a decision on the transmitted symbol from said summation signal;

pluralities of path strength estimators, coupled to said pluralities of delay devices, for estimating the signal strength of each of said pluralities of delayed significant component signals to produce pluralities of path strength signals;

pluralities of error signal generators, coupled to said pluralities of complex multipliers and said decision circuit, for generating the error signal between the output signal of said decision circuit and each of said pluralities of scaled significant component signals to produce pluralities of error signals;

a controller, coupled to relevant devices, responsive to detecting preamble symbols and generating pluralities of initial complex scaling signals, for generating control and timing signals; and said pluralities of complex scaling signal updating devices, each coupled to receive a respective initial complex scaling signal from said controller, a respective path strength signal from one of said pluralities of path strength estimators, and a respective error signal from one of said pluralities of error signal generators, for updating each of said pluralities of complex scaling signals to produce pluralities of updated complex scaling signals.

2. The system as in claim 1, wherein each of said pluralities of complex scaling signal updating devices comprises:

a first multiplexer, coupled to receive the real signal of said respective initial complex scaling signal from said controller and the real signal of a second modified complex scaling signal from a magnitude adjustment device, under the control of said controller, for selecting one of its two input signals as its output signal;

a second multiplexer, coupled to receive the imaginary signal of said respective initial complex scaling signal from said controller and the imaginary signal of said second modified complex scaling signal from said magnitude adjustment device, under the control of said controller, for selecting one of its two input signals as its output signal;

a first register, coupled to said first multiplexer, for saving the output signal of said first multiplexer to produce the real signal of said respective complex scaling signal;

a second register, coupled to said second multiplexer, for saving the output signal of said second multiplexer to produce the imaginary signal of said respective complex scaling signal;

a phase adjustment device, coupled to said first register, said second register, and said respective error signal generator, for adjusting the phase of said respective complex scaling signal to produce a first modified complex scaling signal;

a scaling strength estimator, coupled to said phase adjustment device, for estimating the signal strength of said first modified complex scaling signal to produce a scaling strength signal; and said magnitude adjustment device, coupled to receive said first modified complex scaling signal, said respective path strength signal, and said scaling strength signal, for adjusting the magnitude of said first modified complex scaling signal to produce said second modified complex scaling signal.

3. The system as in claim 2, wherein said phase adjustment device comprises:

a third multiplexer, coupled to pluralities of predefined constant signals, under the control of the output signal of a comparison circuit, for selecting one of said pluralities of predefined constant signals as its output signal;

said comparison circuit, coupled to receive the imaginary signal of said respective error signal, for generating a signal to control said third multiplexer to select one of said pluralities of predefined constant signals;

a first multiplier, coupled to receive the output signal of said third multiplexer and the real signal from said first register, for multiplying said real signal by said output signal to produce a first product signal;

a second multiplier, coupled to receive the output signal of said third multiplexer and the imaginary signal from said second register, for multiplying said imaginary signal by said output signal to produce a second product signal;

a first adder, coupled to said first register and said second multiplier, for subtracting said second product signal from the real signal of said first register to produce the real signal of said first modified complex scaling signal; and a second adder, coupled to said second register and said first multiplier, for adding said first product signal to the imaginary signal of said second register to produce the imaginary signal of said first modified complex scaling signal.

4. The system as in claim 2, wherein said phase adjustment device comprises:

a selecting device, coupled to receive pluralities of predefined constant signals and the output signal of a third multiplexer, for selecting one of said pluralities of predefined constant signals as its output signal;

said third multiplexer, coupled to receive the imaginary signal of said respective error signal and the output signal of a third register, under the control of said controller, for selecting one of its two input signals as its output signal;

a first multiplier, coupled to receive the real signal of said respective error signal and the output signal of said selecting device, for multiplying the two signals together to produce a first product signal;

a first adder, for subtracting said first product signal from the output signal of said third multiplexer; and said third register, coupled to said first adder, for saving the output signal of said first adder.

5. The system as in claim 4, wherein said phase adjustment device further comprises:

a fourth multiplexer, coupled to receive the real signal from said first register and the output signal of a fourth register, under the control of said controller, for selecting one of its two input signals as its output signal;

a fifth multiplexer, coupled to receive the imaginary signal from said second register and the output signal of a fifth register, under the control of said controller, for selecting one of its two input signals as its output signal;

a second multiplier, coupled to said selecting device and said fourth multiplexer, for multiplying the output signal of said fourth multiplexer by the output signal of said selecting device to produce a second product signal;

a third multiplier, coupled to said selecting device and said fifth multiplexer, for multiplying the output signal of said fifth multiplexer by the output signal of said selecting device to produce a third product signal;

a second adder, coupled to said fourth multiplexer and said third multiplier, for subtracting said third product signal from the output signal of said fourth multiplexer to produce the real signal of said first modified complex scaling signal;

a third adder, coupled to said fifth multiplexer and said second multiplier, for adding said second product signal to the output signal of said fifth multiplexer to produce the imaginary signal of said first modified complex scaling signal;

said fourth register, coupled to said second adder, for saving the real signal of said first modified complex scaling signal; and said fifth register, coupled to said third adder, for saving the imaginary signal of said first modified complex scaling signal.

6. The system as in claim 2, wherein said magnitude adjustment device comprises:

a comparison circuit, coupled to receive said path strength signal and said scaling strength signal, for generating a control signal for a third multiplexer;

said third multiplexer, coupled to receive pluralities of positive constant signals, under the control of the control signal of said comparison circuit, for selecting one of said pluralities of positive constant signals as its output signal;

a first multiplier, coupled to said third multiplexer and said phase adjustment device, for multiplying the real signal of said first modified complex scaling signal by the output signal of said third multiplexer to produce the real signal of said second modified complex scaling signal; and a second multiplier, coupled to said third multiplexer and said phase adjustment device, for multiplying the imaginary signal of said first modified complex scaling signal by the output signal of said third multiplexer to produce the imaginary signal of said second modified complex scaling signal.

7. The system as in claim 2, wherein said magnitude adjustment device comprises:

a selecting device, coupled to receive pluralities of predefined constant signals, said path strength signal, and the output signal of a third multiplexer, for selecting one of said pluralities of predefined constant signals as its output signal;

said third multiplexer, coupled to receive said scaling strength signal and the output signal of a third register, under the control of said controller, for selecting one of its two input signals as its output signal;

a first multiplier, coupled to said third multiplexer and said selecting device, for multiplying the output signal of said selecting device by the output signal of said third multiplexer to produce a first product signal;

said third register, coupled to said first multiplier, for saving said first product signal;

a fourth multiplexer, coupled to receive the real signal of said first modified complex scaling signal from said phase adjustment device and the output signal of a fourth register, under the control of said controller, for selecting one of its two input signals as its output signal;

a fifth multiplexer, coupled to receive the imaginary signal of said first modified complex scaling signal from said phase adjustment device and the output signal of a fifth register, under the control of said controller, for selecting one of its two input signals as its output signal;

a second multiplier, coupled to receive the output signal of said fourth multiplexer and the output signal of said selecting device, for multiplying its two input signals together to produce the real signal of said second modified complex scaling signal;

a third multiplier, coupled to receive the output signal of said fifth multiplexer and the output signal of said selecting device, for multiplying its two input signals together to produce the imaginary signal of said second modified complex scaling signal;

said fourth register, coupled to said second multiplier, for saving the real signal of said second modified complex scaling signal; and said fifth register, coupled to said third multiplier, for saving the imaginary signal of said second modified complex scaling signal.

8. A system for generating a complex scaling signal for a significant component signal of a multipath fading signal, receiving pluralities of control signals, an initial complex scaling signal, a complex error signal, and a path strength signal, said system comprising:

first multiplexing means, coupled to receive said initial complex scaling signal and a second modified complex scaling signal from magnitude adjusting means, under the control of a control signal of said pluralities of control signals, for selecting one of its two complex input signals as its complex output signal;

first register means, coupled to said first multiplexing means, for saving the complex output signal of said first multiplexing means to produce said complex scaling signal;

phase adjusting means, coupled to receive said complex scaling signal from said first register means and said complex error signal, for adjusting the phase of said complex scaling signal to produce a first modified complex scaling signal;

scaling strength means, coupled to said phase adjusting means, for estimating the signal strength of said first modified complex scaling signal to produce a scaling strength signal; and said magnitude adjusting means, coupled to receive said scaling strength signal from said scaling strength means, said first modified complex scaling signal from said phase adjusting means, and said path strength signal, for adjusting the magnitude of said first modified complex scaling signal to produce said second complex scaling signal.

9. The system as in claim 8, wherein said phase adjusting means comprise:

second multiplexing means, coupled to receive pluralities of predefined constant signals and a control signal from comparing means, for selecting one of said pluralities of predefined constant signals as its output signal;

said comparing means, coupled to the imaginary signal of said complex error signal, for generating a control signal for said second multiplexing means;

multiplying means, coupled to said first register means and said second multiplexing means, for multiplying said complex scaling signal by the output signal of said second multiplexing means to produce a complex product signal;

first adding means, coupled to said multiplying means and said first register means, for subtracting the imaginary signal of said complex product signal from the real signal of said complex scaling signal to produce the real signal of said first modified complex scaling signal; and second adding means, coupled to said multiplying means and said first register means, for adding the real of said complex product signal to the imaginary signal of said complex scaling signal to produce the imaginary signal of said first modified complex scaling signal.

10. The system as in claim 8, wherein said phase adjusting means comprise:

selecting means, coupled to receive pluralities of predefined constant signals and the output signal of second multiplexing means, for selecting one signal from said pluralities of predefined constant signals as its output signal;

said second multiplexing means, coupled to receive the imaginary signal of said complex error signal and the output signal of second register means, under the control of a control signal of said pluralities of control signals, for selecting one of its two input signals as its output signal;

first multiplying means, coupled to receive the real signal of said error signal and the output signal of said selecting means, for multiplying the two signals together to produce a first product signal;

first adding means, coupled to said second multiplexing means and said first multiplying means, for subtracting said first product signal from the output signal of said second multiplexing means; and said second register means, coupled to said first adding means, for saving the output signal of said first adding means.

11. The system as in claim 10, wherein said phase adjusting means further comprise:

third multiplexing means, coupled to receive the real signal of said complex scaling signal from said first register means and the output signal of third register means, under the control of a control signal of said pluralities of control signals, for selecting one of its two input signals as its output signal;

fourth multiplexing means, coupled to receive the imaginary signal of said complex scaling signal from said first register means and the output signal of fourth register means, under the control of said control signal of said pluralities of control signals, for selecting one of its two input signals as its output signal;

second multiplying means, coupled to said selecting means and said third multiplexing means, for multiplying the output signal of said selecting means by the output signal of said third multiplexing means to produce a second product signal;

third multiplying means, coupled to said selecting means and said fourth multiplexing means, for multiplying the output signal of said selecting means by the output signal of said fourth multiplexing means to produce a third product signal;

second adding means, coupled to said third multiplexing means and said third multiplying means, for subtracting said third product signal from the output signal of said third multiplexing means to produce the real signal of said first modified complex signal;

third adding means, coupled to said fourth multiplexing means and said second multiplying means, for adding said second product signal to the output signal of said fourth multiplexing means to produce the imaginary signal of said first modified complex signal;

said third register means, coupled to said second adding means, for saving the real signal of said first modified complex scaling signal; and said fourth register means, coupled to said third adding means, for saving the imaginary signal of said first modified complex scaling signal.

12. The system as in claim 8, wherein said magnitude adjusting means comprise:

comparing means, coupled to receive said path strength signal and said scaling strength signal from said scaling strength means, for generating a control signal for second multiplexing means;

said second multiplexing means, coupled to receive pluralities of positive values and said control signal from said comparing means, for selecting one of said pluralities of positive values as its output signal; and multiplying means, coupled to said first register means and said second multiplexing means, for multiplying the output signal of said first register means by the output signal of said second multiplexing means to produce said second modified complex scaling signal.

13. The system as in claim 8, wherein said magnitude adjusting means comprise:

second multiplexing means, coupled to receive said scaling strength signal from said scaling strength means and the output signal of second register means, under the control of a control signal of said pluralities of control signals, for selecting one of its two input signals as its output signal;

selecting means, coupled to receive pluralities of positive values, said path strength signal, and the output signal of said second multiplexing means, for selecting one of said pluralities of positive values as its output signal;

first multiplying means, coupled to said second multiplexing means and said selecting means, for multiplying the two signals together to produce a first product signal; and said second register means, coupled to said first multiplying means, for saving said first product signal.

14. The system as in claim 13, wherein said magnitude adjusting means further comprise:

third multiplexing means, coupled to receive the real signal of said first modified complex scaling signal from said phase adjusting means and the output signal of third register means, under the control of a control signal of said pluralities of control signals, for selecting one of its two input signals as its output signal;

fourth multiplexing means, coupled to receive the imaginary signal of said first modified complex scaling signal from said phase adjusting means and the output signal of fourth register means, under the control of said control signal of said pluralities of control signals, for selecting one of its two input signals as its output signal;

second multiplying means, coupled to said third multiplexing means and said selecting means, for multiplying the output signal of said third multiplexing means by the output signal of said selecting means to produce the real signal of said second modified complex scaling signal;

third multiplying means, coupled to said fourth multiplexing means and said selecting means, for multiplying the output signal of said fourth multiplexing means by the output signal of said selecting means to produce the imaginary signal of said second modified complex scaling signal;

said third register means, coupled to said second multiplying means, for saving the real signal of said second modified complex signal; and said fourth register means, coupled to said third multiplying means, for saving the imaginary signal of said second modified complex signal.

15. A method of combining pluralities of significant component signals of a multipath fading signal together and correcting both frequency error and phase error associated with each of said pluralities of significant component signals, comprising:

generating an initial complex scaling signal for each of said pluralities of significant component signals to produce pluralities of initial complex scaling signals;

taking each of said pluralities of initial complex scaling signals as each of pluralities of complex scaling signals respectively;

delaying each of said pluralities of significant component signals by a different amount of time to produce pluralities of delayed significant component signals;

multiplying each of said pluralities of delayed significant component signals by each of said pluralities of complex scaling signal respectively to produce pluralities of product signals;

adding said pluralities of product signals together to produce a summation signal;

making decisions on the transmitted symbols from said summation signal;

estimating the path strength for each of said pluralities of delayed significant component signals to produce pluralities of path strength signals;

estimating the error signal for each of said pluralities of product signals to produce pluralities of error signals; and adjusting the phase and magnitude of each of said pluralities of complex scaling signals to produce pluralities of updated complex scaling signals.

16. The method as in claim 15, wherein adjusting the phase and magnitude of each of said pluralities of complex scaling signals, said method carried out for adjusting phase and magnitude of a complex scaling signal comprising:

adjusting the phase of said complex scaling signals to produce a first modified complex scaling signal;

estimating the signal strength of said first modified complex scaling signals to produce a scaling strength signal;

adjusting the magnitude of said first modified complex scaling signal to produce a second modified complex scaling signal; and taking said second modified complex scaling signal as the updated said complex scaling signal.

17. The method as in claim 16, wherein adjusting the phase of said corresponding complex scaling signal comprises:

predefining pluralities of values with both positive value and negative values;

determining if the imaginary signal of a respective error signal is positive;

selecting a positive value from said pluralities of values when said imaginary signal is positive and selecting a negative value from said pluralities of values when said imaginary signal is negative;

multiplying the selected value by said corresponding complex scaling signal to produce a complex product signal;

subtracting the imaginary signal of said complex product signal from the real signal of said corresponding complex scaling signal to produce the real signal of said first modified complex scaling signal; and adding the real signal of said complex product signal to the imaginary signal of said corresponding complex scaling signal to produce the imaginary signal of said first modified complex scaling signal.

18. The method as in claim 16, wherein adjusting the phase of said corresponding complex scaling signal comprises:

defining pluralities of values with both positive value and negative values;

multiplying each of said pluralities of values by the real signal of a respective error signal to produce pluralities of modified values;

selecting a first value from said pluralities of modified values, with said first value best matched to the imaginary signal of said respective error signal;

selecting a second value from said pluralities of values, with said second value corresponding to said first one;

subtracting said first value from the imaginary signal of said respective error signal to produce updated imaginary signal of said respective error signal;

multiplying said complex scaling signal by said second value to produce a complex product signal;

subtracting the imaginary signal of said complex product signal from the real signal of said complex scaling signal to produce the real signal of said first modified complex scaling signal;

adding the real signal of said complex product signal to the imaginary signal of said complex scaling signal to produce the imaginary signal of said first modified complex scaling signal;

taking said first modified scaling signal as the updated said complex scaling signal; and repeating step 2 to step 9 for a predefined number of times during each symbol period.

19. The method as in claim 16, wherein adjusting the magnitude of said first modified complex scaling signal comprises:

defining pluralities of positive values with some values larger than 1 and some values smaller than 1;

selecting a value larger 1 from said pluralities of positive values when said path strength signal is larger than summation of said scaling strength signal and a predefined positive number;

selecting a value smaller than 1 from said pluralities of positive values when said path strength signal is smaller than summation of said scaling strength signal and a predefined negative number; and multiplying said first modified complex scaling signal by the selected value to produce said second modified complex scaling signal.

20. The method as in claim 16, wherein adjusting the magnitude of said first modified complex scaling signal comprises:

defining pluralities of positive values with some values larger than 1 and some values smaller than 1;

selecting a value from said pluralities of positive values, with the product of said value multiplied by said scaling strength signal closed to said path strength;

multiplying the selected value by said scaling strength signal to produce an updated scaling strength signal;

multiplying said selected value by said first modified complex scaling signal to produce said second modified complex scaling signal;

taking said second modified complex scaling signal as said first modified complex scaling signal; and repeating step 2 to step 4 for a predefined number of times during each symbol period.

* * * * *